United States Patent
Otroshi Shahreza et al.

(10) Patent No.: US 11,308,598 B2
(45) Date of Patent: Apr. 19, 2022

(54) QUALITY ASSESSMENT OF AN IMAGE

(71) Applicants: Hatef Otroshi Shahreza, Shahreza (IR); Arash Amini, Tehran (IR); Hamid Behroozi, Tehran (IR)

(72) Inventors: Hatef Otroshi Shahreza, Shahreza (IR); Arash Amini, Tehran (IR); Hamid Behroozi, Tehran (IR)

(73) Assignee: SHARIF UNIVERSITY OF TECHNOLOGY, Tehran (IR)

( * ) Notice: Subject to any disclaimer, the term of this patent is extended or adjusted under 35 U.S.C. 154(b) by 127 days.

(21) Appl. No.: 16/790,791

(22) Filed: Feb. 14, 2020

(65) Prior Publication Data
US 2020/0184627 A1 Jun. 11, 2020

Related U.S. Application Data

(60) Provisional application No. 62/805,325, filed on Feb. 14, 2019.

(51) Int. Cl.
*G06T 7/00* (2017.01)
*G06N 3/04* (2006.01)
*G06N 3/08* (2006.01)

(52) U.S. Cl.
CPC ......... *G06T 7/0002* (2013.01); *G06N 3/0472* (2013.01); *G06N 3/0481* (2013.01); *G06N 3/08* (2013.01); *G06T 2207/20081* (2013.01); *G06T 2207/20084* (2013.01)

(58) Field of Classification Search
CPC ...... G06N 3/0454; G06N 3/0481; G06N 3/08; G06T 2207/30168; G06T 7/0002
See application file for complete search history.

(56) References Cited

U.S. PATENT DOCUMENTS

| | | | |
|---|---|---|---|
| 2017/0270653 A1* | 9/2017 | Garnavi | G06N 20/20 |
| 2018/0137389 A1* | 5/2018 | Mathieu | G06K 9/00718 |
| 2018/0144214 A1* | 5/2018 | Hsieh | G06K 9/036 |
| 2019/0050681 A1* | 2/2019 | Tate | G06T 7/143 |
| 2019/0122115 A1* | 4/2019 | Wang | G06K 9/036 |

(Continued)

OTHER PUBLICATIONS

X. Tan and B. Triggs, "Enhanced Local Texture Feature Sets for Face Recognition Under Difficult Lighting Conditions," in IEEE Transactions on Image Processing, vol. 19, No. 6, pp. 1635-1650, Jun. 2010, doi: 10.1109/TIP.2010.2042645. (Year: 2010).*

*Primary Examiner* — Ross Varndell
(74) *Attorney, Agent, or Firm* — Bajwa IP Law Firm; Haris Zaheer Bajwa

(57) ABSTRACT

A method for quality assessment of an image. The method includes generating an $(i+1)^{th}$ plurality of feature maps from an image, obtaining an $(i+1)^{th}$ feature set of a plurality of feature sets from the $(i+1)^{th}$ plurality of feature maps, and extracting a score distribution for a plurality of scores from the plurality of feature sets. The plurality of scores are associated with the image. The score distribution is extracted by feeding the plurality of feature sets to a first $(1^{st})$ fully connected layer of a plurality of fully connected layers. The plurality of fully connected layers are associated with a convolutional neural network.

20 Claims, 13 Drawing Sheets

100

(56) References Cited

U.S. PATENT DOCUMENTS

| | | | |
|---|---|---|---|
| 2019/0220746 A1* | 7/2019 | Liu | G06K 9/6262 |
| 2020/0250402 A1* | 8/2020 | Kim | G06K 9/6257 |
| 2020/0327308 A1* | 10/2020 | Cheng | G06K 9/629 |
| 2021/0004935 A1* | 1/2021 | Yao | G06T 3/4053 |

* cited by examiner

108

116

106

QUALITY ASSESSMENT OF AN IMAGE

CROSS-REFERENCE TO RELATED APPLICATION

This application claims the benefit of priority from U.S. Provisional Patent Application Ser. No. 62/805,325, filed on Feb. 14, 2019, and entitled "PREDICTING THE DISTRIBUTION OF HUMAN OPINION SCORE IN THE ASSESSMENT OF IMAGE QUALITY," which is incorporated herein by reference in its entirety.

TECHNICAL FIELD

The present disclosure generally relates to image quality assessment, and particularly, to image quality assessment based on convolutional neural networks.

BACKGROUND

Image quality assessment maps images, regarded as distorted views of real-world scenes, to corresponding quality scores on a numerical scale. Methods for image quality assessment may be evaluated based on a performance for benchmark image quality databases that are labeled by subjective quality scores obtained from human expert viewers. Predicting a quality score measure may facilitate a content provider to guarantee a desired percentage of satisfied users. One quality score measure is mean opinion score (MOS) that represents an overall quality of an image and is given as a decimal number. However, images with approximately same MOS may have different quality score distributions. These distributions may include information about how much consensus or divergence exists among individual ratings.

Conventional image quality assessment methods may extract predefined features from an image. These features may then be used to predict MOS. These methods may be useful for MOS prediction of synthetically distorted images. However, they may provide low quality predictions for real-world images since real-world images may suffer from various combinations of artifacts. There is, therefore, a need for an image quality assessment method that may provide a high quality prediction for a quality score distribution of a real-world image.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for quality assessment of an image. An exemplary method may include generating an $(i+1)^{th}$ plurality of feature maps from an image, obtaining an $(i+1)^{th}$ feature set of a plurality of feature sets from the $(i+1)^{th}$ plurality of feature maps, and extracting a score distribution for a plurality of scores from the plurality of feature sets. The plurality of scores may be associated with the image. The score distribution may be extracted by feeding the plurality of feature sets to a first ($1^{st}$) fully connected layer of a plurality of fully connected layers. The plurality of fully connected layers may be associated with a convolutional neural network.

In an exemplary embodiment, generating the $(i+1)^{th}$ plurality of feature maps may include feeding the image to a first ($1^{st}$) convolutional layer of a plurality of convolutional layers, and extracting the $(i+1)^{th}$ plurality of feature maps. In an exemplary embodiment, extracting the $(i+1)^{th}$ plurality of feature maps may include applying an $i^{th}$ plurality of feature maps to an $i^{th}$ convolutional layer of the plurality of convolutional layers, where $1 \le i \le N$ and N is a number of the plurality of convolutional layers. The plurality of convolutional layers may be associated with the convolutional neural network. The image may include a first ($1^{st}$) plurality of feature maps.

In an exemplary embodiment, generating the $(i+1)^{th}$ plurality of feature maps may include training the convolutional neural network prior to feeding the image to a first ($1^{st}$) convolutional layer. In an exemplary embodiment, training the convolutional neural network may include initializing the convolutional neural network by a plurality of initial weights and repeating an iterative process until a termination condition is satisfied. In an exemplary embodiment, repeating the iterative process may include generating a plurality of updated weights and replacing the plurality of initial weights with the plurality of updated weights. In an exemplary embodiment, the plurality of updated weights may be generated by feeding a training image of a plurality of training images to the convolutional neural network.

In an exemplary embodiment, generating the plurality of updated weights may include generating an $(i+1)^{th}$ plurality of training feature maps from the training image, obtaining an $(i+1)^{th}$ training feature set of a plurality of training feature sets from the $(i+1)^{th}$ plurality of training feature maps, extracting a training distribution from the plurality of training feature sets, generating a plurality of adjustment values by minimizing a loss function, and obtaining the plurality of updated weights by adding each of the plurality of adjustment values to a respective initial weight of the plurality of initial weights. In an exemplary embodiment, generating the $(i+1)^{th}$ plurality of training feature maps may include feeding the training image to the first ($1^{st}$) convolutional layer of the plurality of convolutional layers and extracting the $(i+1)^{th}$ plurality of training feature maps from an output of the $i^{th}$ convolutional layer. In an exemplary embodiment, extracting the training distribution may include feeding the plurality of training feature sets to a first ($1^{st}$) fully connected layer of the plurality of fully connected layers. In an exemplary embodiment, each of the plurality of adjustment values may be associated with a respective initial weight of the plurality of initial weights.

In an exemplary embodiment, extracting the $(i+1)^{th}$ plurality of feature maps may include generating an $(i+1)^{th}$ plurality of filtered feature maps, generating an $(i+1)^{th}$ plurality of normalized feature maps, generating an $(i+1)^{th}$ plurality of non-linear feature maps, and generating the $(i+1)^{th}$ plurality of feature maps. In an exemplary embodiment, generating the $(i+1)^{th}$ plurality of filtered feature maps may include applying an $i^{th}$ plurality of filters on the $i^{th}$ plurality of feature maps. In an exemplary embodiment, the $i^{th}$ plurality of filters may be associated with an $i^{th}$ convolutional layer. In an exemplary embodiment, generating the $(i+1)^{th}$ plurality of normalized feature maps may include applying a batch normalization process on the $(i+1)^{th}$ plurality of filtered feature maps. In an exemplary embodiment, the batch normalization process may be associated with the $i^{th}$ convolutional layer. In an exemplary embodiment, each normalized feature map of the $(i+1)^{th}$ plurality of normalized feature maps may be associated with a respective filtered feature map of the $(i+1)^{th}$ plurality of filtered feature maps. In an exemplary embodiment, generating the $(i+1)^{th}$ plurality of non-linear feature maps may include implementing an $i^{th}$ non-linear activation function on each of the $(i+1)^{th}$ plurality of normalized feature maps. In an exemplary embodiment, the $i^{th}$ non-linear activation function associated with the $i^{th}$ convolutional layer. In an exemplary embodiment, generating the $(i+1)^{th}$ plurality of feature maps may include applying a max pooling on each of the $(i+1)^{th}$ plurality of non-linear feature maps. In an exemplary embodiment, the max pooling may be associated with the $i^{th}$ convolutional layer.

In an exemplary embodiment, obtaining the $(i+1)^{th}$ feature set may include applying a global average pooling on the $(i+1)^{th}$ plurality of non-linear feature maps. In an exemplary embodiment, the global average pooling may include obtaining an average of each non-linear feature map of the $(i+1)^{th}$ plurality of non-linear feature maps. In an exemplary embodiment, applying the $i^{th}$ plurality of filters on the $i^{th}$ plurality of feature maps may include applying a separable convolution on the $i^{th}$ plurality of feature maps.

In an exemplary embodiment, extracting the score distribution from the plurality of feature sets may include generating a first ($1^{st}$) fully connected output of a plurality of fully connected outputs and generating a $k^{th}$ fully connected output of the plurality of fully connected outputs. In an exemplary embodiment, generating the first ($1^{st}$) fully connected output may include applying the plurality of feature sets to the first ($1^{st}$) fully connected layer of the plurality of fully connected layers. In an exemplary embodiment, generating the $k^{th}$ fully connected output may include applying a $(k-1)^{th}$ fully connected output of a plurality of fully connected outputs to a $k^{th}$ fully connected layer of the plurality of fully connected layers, where $1 \leq k \leq L$, and L is a number of the plurality of fully connected layers. In an exemplary embodiment, applying the $(k-1)^{th}$ fully connected output to the $k^{th}$ fully connected layer may include implementing an $(N+k)^{th}$ non-linear activation function on the $(k-1)^{th}$ fully connected output. In an exemplary embodiment, an $(N+L)^{th}$ non-linear activation function may include a softmax function. In an exemplary embodiment, a $0^{th}$ fully connected output may include the plurality of feature sets. In an exemplary embodiment, an $L^{th}$ fully connected output of the plurality of fully connected outputs may include the score distribution.

In an exemplary embodiment, extracting the $(i+1)^{th}$ plurality of training feature maps may include applying a first dropout process on the output of the $i^{th}$ convolutional layer. In an exemplary embodiment, extracting the training distribution may include applying a second dropout process on an output of the $k^{th}$ fully connected layer. In an exemplary embodiment, implementing each of the $i^{th}$ non-linear activation function and the $(N+k)^{th}$ non-linear activation function may include implementing one of a rectified linear unit (ReLU) function or an exponential linear unit (ELU) function.

In an exemplary embodiment, repeating the iterative process may include repeating the iterative process until a value of the loss function becomes lower than a predefined threshold.

In an exemplary embodiment, the loss function may be defined by $$L(p, q) = \sum_{m=1}^{M} p_m \log\left(\frac{p_m}{q_m}\right),$$

where $L(\cdot, \cdot)$ is the loss function, p is the training distribution, q is a ground truth distribution associated with the training image, $p_m$ is an $m^{th}$ component of the training distribution, $q_m$ is an $m^{th}$ component of the ground truth distribution, and M is a number of the plurality of scores.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for quality assessment of an image. An exemplary method may provide a prediction of a score distribution for an exemplary image utilizing a convolutional neural network. In doing so, a number of feature maps may be generated by a number of cascaded convolutional layers. Each convolution layer may generate an exemplary set of feature maps from its input and may pass the exemplary set of feature maps to a next convolutional layer. Each convolutional layer may apply filtering, normalization, and non-linear operations on an exemplary input provided by a previous convolutional layer. To utilize different combinations of feature maps, each set of feature maps generated by each respective convolutional layer may be directly utilized for prediction of the score distribution. For a size of feature maps to be independent of a size of the image, a predefined number of features may be extracted from each respective feature map by applying a global averaging process on each feature map prior to prediction of the score distribution. As a result, a fixed number of inputs may be provided to be applied to a number of fully connected layers that are utilized for score distribution prediction. Each of the fully connected layers may apply a non-linear activation function on its input and may pass a result to a next fully connected layer. Finally, the score distribution may be achieved at an output of the last fully connected layer.

Figure 1A:
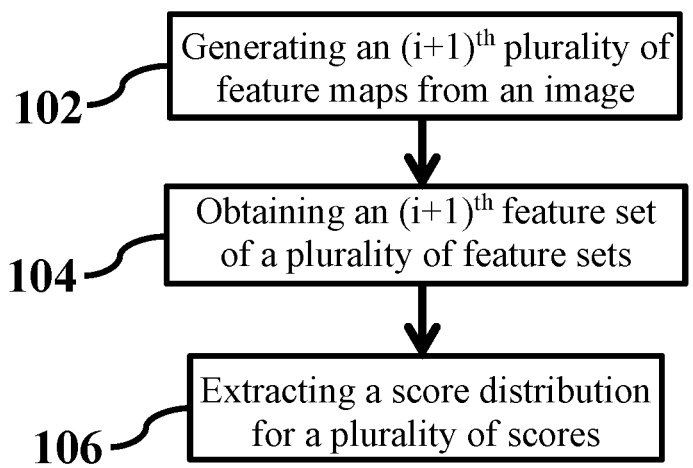
FIG. 1A shows a flowchart of a method for quality assessment of an image, consistent with one or more exemplary embodiments of the present disclosure.

FIG. 1A shows a flowchart of a method for quality assessment of an image, consistent with one or more exemplary embodiments of the present disclosure. An exemplary method 100 may include generating an $(i+1)^{th}$ plurality of feature maps from an image (step 102), obtaining an $(i+1)^{th}$ feature set of a plurality of feature sets from the $(i+1)^{th}$ plurality of feature maps (step 104), and extracting a score distribution for a plurality of scores from the plurality of feature sets (step 106).

Figure 2A:
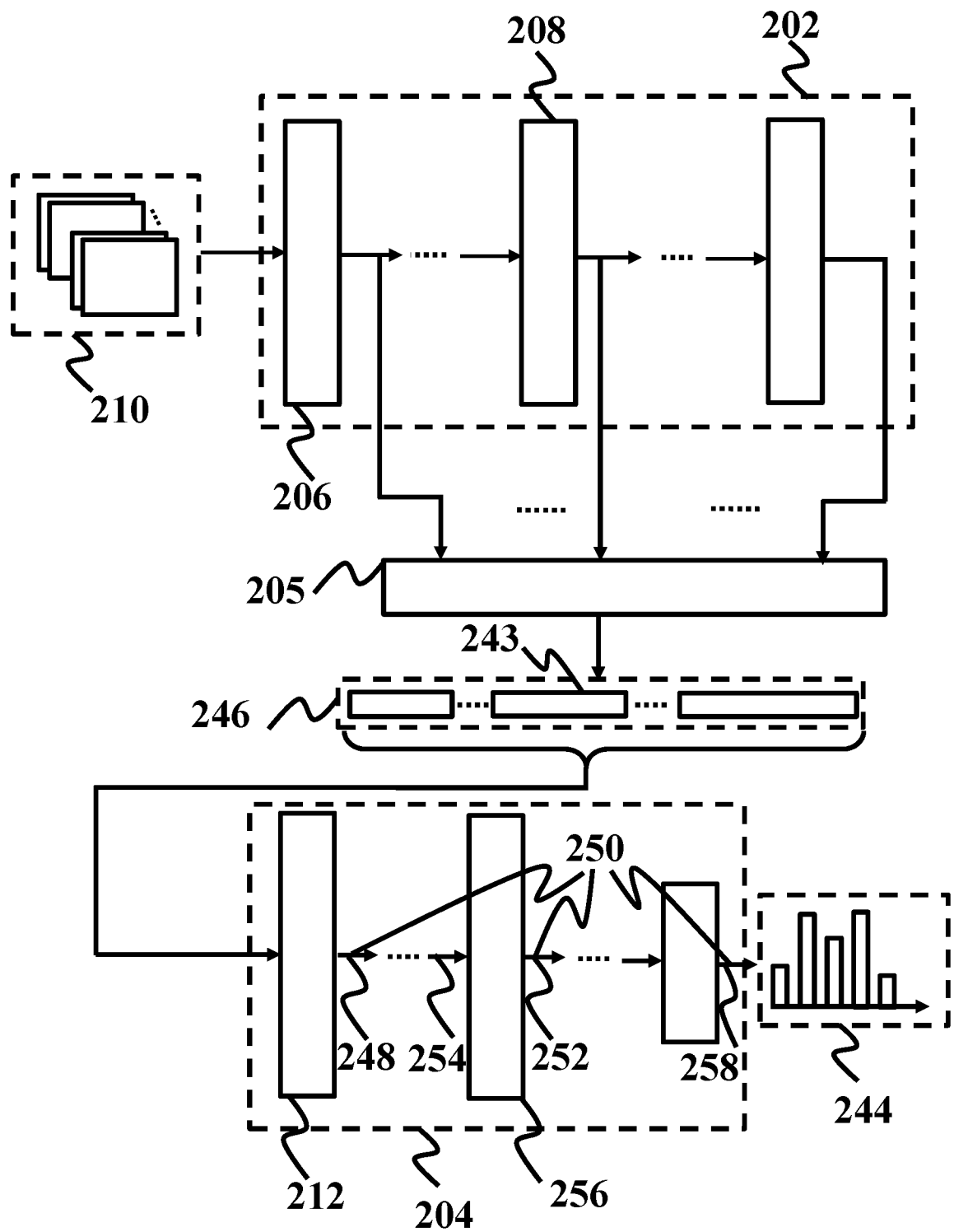
FIG. 2A shows a schematic of a convolutional neural network, consistent with one or more exemplary embodiments of the present disclosure.

FIG. 2A shows a schematic of a convolutional neural network, consistent with one or more exemplary embodiments of the present disclosure. In an exemplary embodiment, different steps of method 100 may be implemented utilizing an exemplary convolutional neural network 200A. In an exemplary embodiment, convolutional neural network 200A may include a plurality of convolutional layers 202, a plurality of fully connected layers 204, and a global average pooling layer 205. In an exemplary embodiment, plurality of convolutional layers 202 may include a first ($1^{st}$) convolutional layer 206 and an $i^{th}$ convolutional layer 208, where $1 \le i \le N$ and N is a number of plurality of convolutional layers 202. In an exemplary embodiment, first ($1^{st}$) convolutional layer 2-6 may be configured to receive an image 210. In an exemplary embodiment, convolutional neural network 200A may be implemented utilizing a processor. In an exemplary embodiment, first ($1^{st}$) convolutional layer 206 may receive image 210 from the processor. In an exemplary embodiment, the processor may receive image 210 from an imaging device (such as a camera) or a memory. In an exemplary embodiment, plurality of fully connected layers 204 may include a first ($1^{st}$) fully connected layer 212.

Figure 2B:
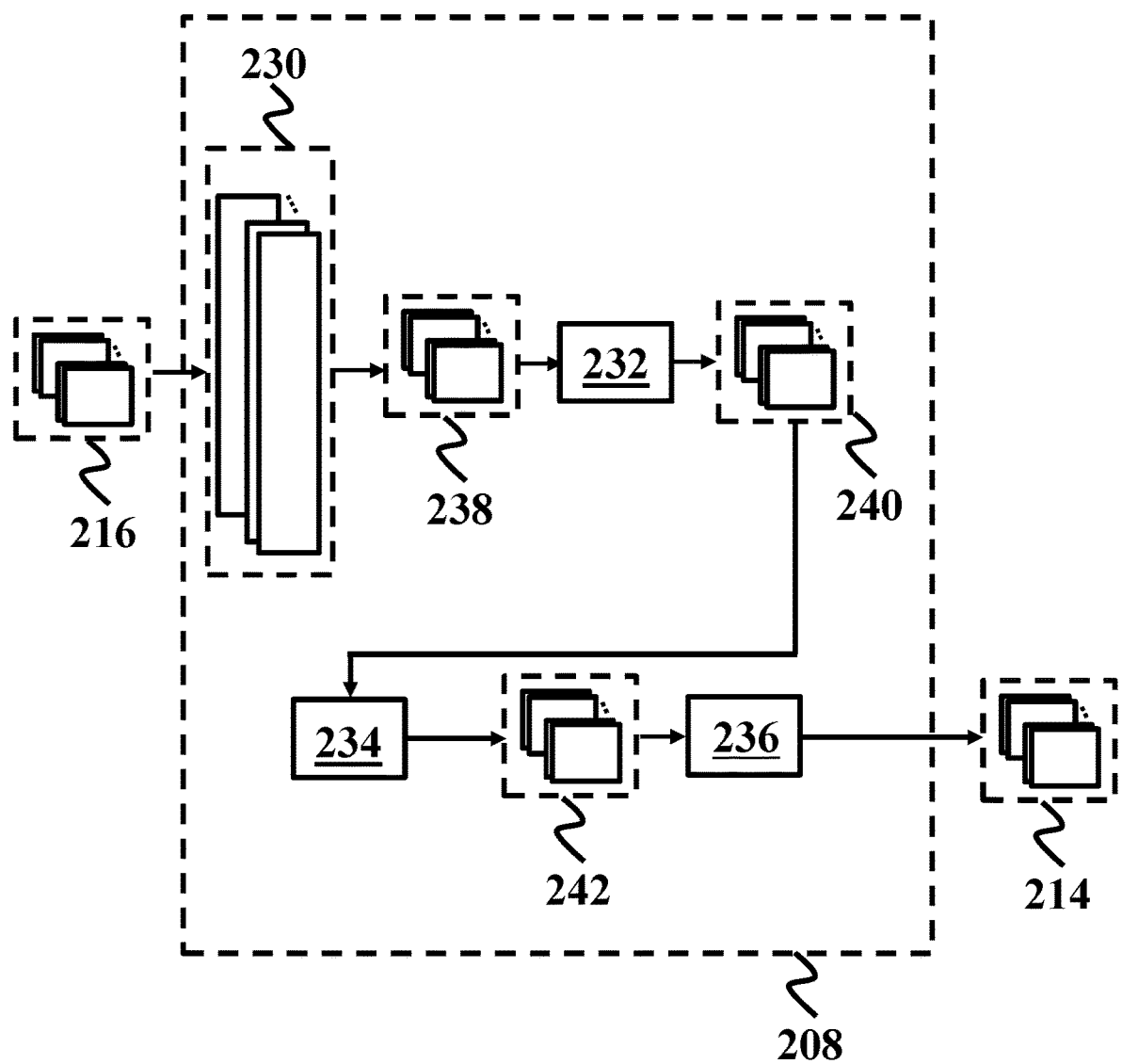
FIG. 2B shows a schematic of a convolutional layer, consistent with one or more exemplary embodiments of the present disclosure.

FIG. 2B shows a schematic of a convolutional layer, consistent with one or more exemplary embodiments of the present disclosure. In an exemplary embodiment, $i^{th}$ convolutional layer 208 may be configured to extract an $(i+1)^{th}$ plurality of feature maps 214 from an $i^{th}$ plurality of feature maps 216. For example, first ($1^{st}$) convolutional layer 206 may be configured to extract a second ($2^{nd}$) plurality of feature maps from a first ($1^{st}$) plurality of feature maps.

Figure 1B:
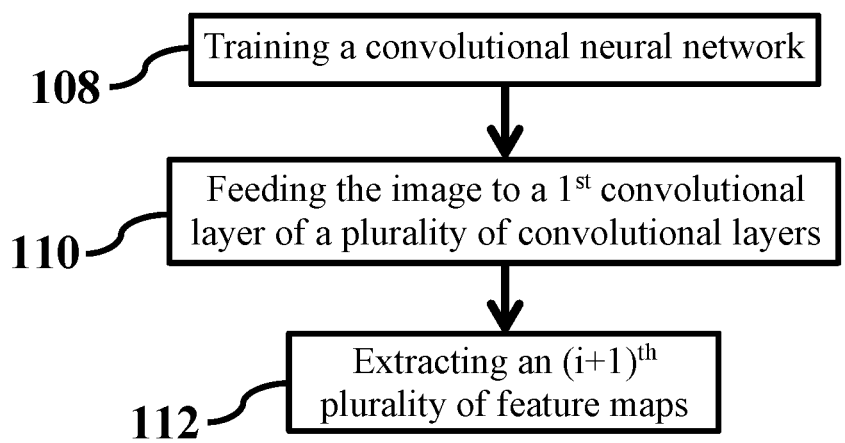
FIG. 1B shows a flowchart for generating a plurality of feature maps, consistent with one or more exemplary embodiments of the present disclosure.

For further detail with respect to step 102, FIG. 1B shows a flowchart for generating a plurality of feature maps, consistent with one or more exemplary embodiments of the present disclosure. Referring to FIGS. 1B, 2A, and 2B, in an exemplary embodiment, generating $(i+1)^{th}$ plurality of feature maps 214 may include training convolutional neural network 200A (step 108), feeding image 210 first ($1^{st}$) convolution layer 206 of plurality of convolutional layers 202 (step 110), and extracting $(i+1)^{th}$ plurality of feature maps 214 (step 112).

Figure 1C:
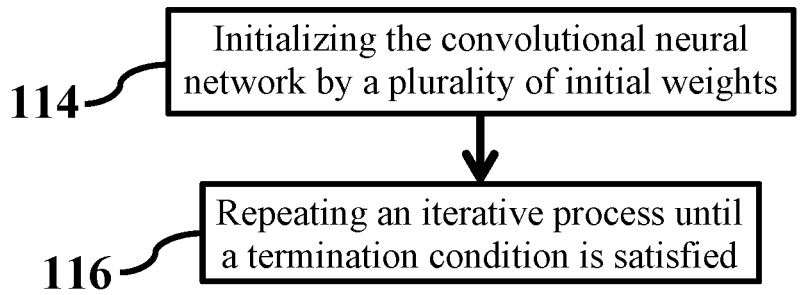
FIG. 1C shows a flowchart for training a convolutional neural network, consistent with one or more exemplary embodiments of the present disclosure.
Figure 2C:
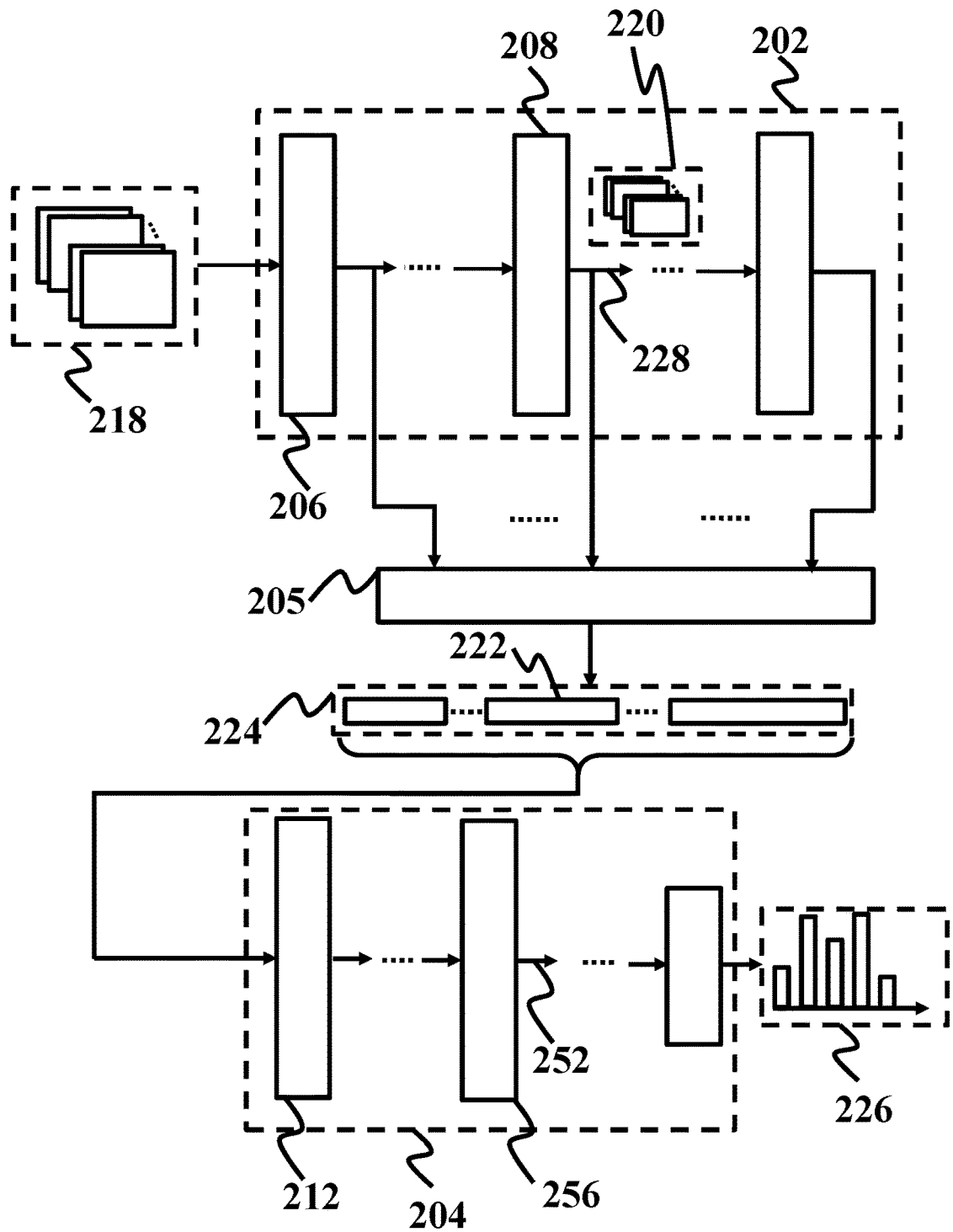
FIG. 2C shows a schematic of a convolutional neural network in a training phase, consistent with one or more exemplary embodiments of the present disclosure.

In further detail with regards to step 108, FIG. 1C shows a flowchart for training a convolutional neural network, consistent with one or more exemplary embodiments of the present disclosure. FIG. 2C shows a schematic of a convolutional neural network in a training phase, consistent with one or more exemplary embodiments of the present disclosure. In an exemplary embodiment, training convolutional neural network 200A may include initializing convolutional neural network 200A by a plurality of initial weights (step 114) and repeating an iterative process until a termination condition is satisfied (step 116).

For further detail regarding step 114, in an exemplary embodiment, initializing convolutional neural network 200A may include generating the plurality of initial weights. In an exemplary embodiment, a respective number of initial weights of the plurality of initial weights may be multiplied by an output of each respective convolutional layer of plurality of convolutional layers 202. In an exemplary embodiment, a respective multiplication result may be fed to a subsequent convolutional layer of plurality of convolutional layers 202. In an exemplary embodiment, a respective number of initial weights of the plurality of initial weights may be multiplied by an output of each respective fully connected layer of plurality of fully connected layers 204. In an exemplary embodiment, a respective multiplication result may be fed to a subsequent fully connected layer of plurality of fully connected layers 204.

In an exemplary embodiment, generating the plurality of initial weights may include generating a plurality of random variables from a predefined probability distribution. In an exemplary embodiment, the predefined probability distribution may be determined by a designer of convolutional neural network 200A according to a required range of each initial weight. In an exemplary embodiment, the predefined probability distribution may be selected from Gaussian or uniform probability distributions.

Figure 1D:
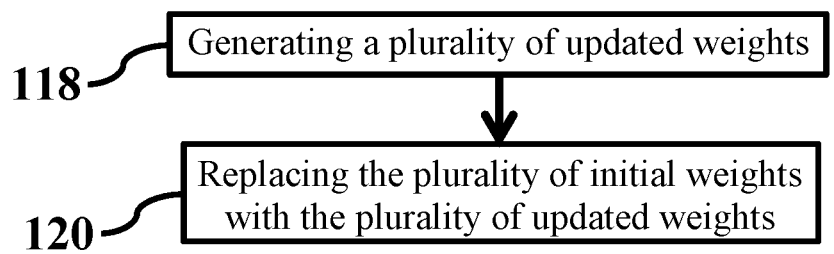
FIG. 1D shows a flowchart of an iterative process, consistent with one or more exemplary embodiments of the present disclosure.

In further detail with respect to step 116, FIG. 1D shows a flowchart of an iterative process, consistent with one or more exemplary embodiments of the present disclosure. In an exemplary embodiment, the iterative process may include generating a plurality of updated weights (step 118) and replacing the plurality of initial weights with the plurality of updated weights (step 120). In an exemplary embodiment, the plurality of updated weights may be generated by feeding a training image 218 of a plurality of training images to convolutional neural network 200A.

Figure 1E:
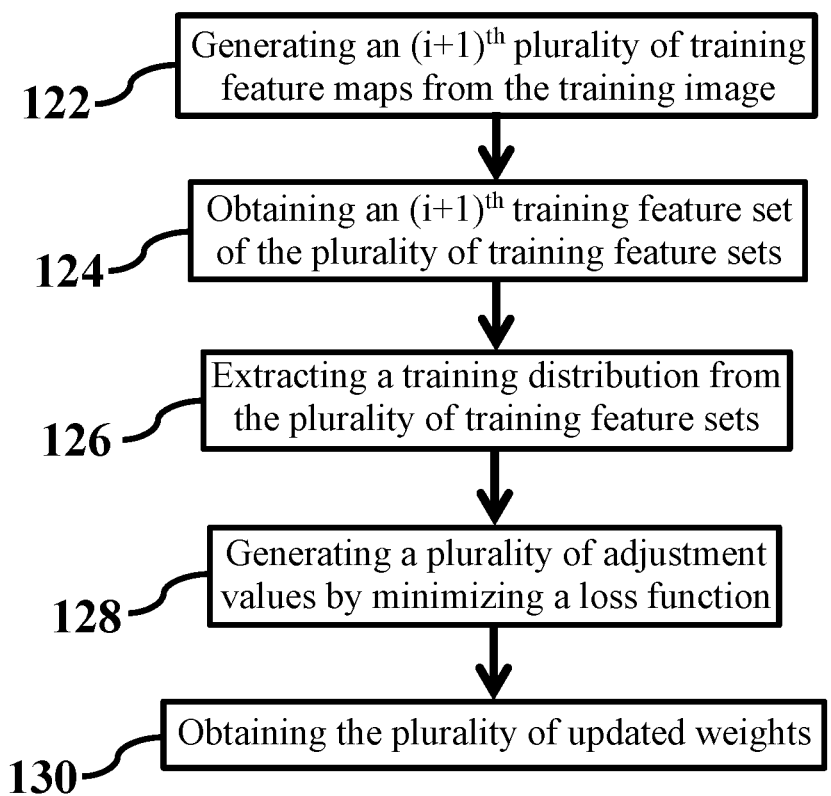
FIG. 1E shows a flowchart for generating a plurality of updated weights, consistent with one or more exemplary embodiments of the present disclosure.

In further detail with respect to step 118, FIG. 1E shows a flowchart for generating a plurality of updated weights, consistent with one or more exemplary embodiments of the present disclosure. Referring to FIGS. 1E and 2C, in an exemplary embodiment, generating the plurality of updated weights may include generating an $(i+1)^{th}$ plurality of training feature maps 220 from training image 218 (step 122), obtaining an $(i+1)^{th}$ training feature set 222 of a plurality of training feature sets 224 from $(i+1)^{th}$ plurality of training feature maps 220 (step 124), extracting a training distribution 226 from plurality of training feature sets 224 (step 126), generating a plurality of adjustment values by minimizing a loss function (step 128), and obtaining the plurality of updated weights (step 130). In an exemplary embodiment, the iterative process may be repeated until a value of the loss function becomes lower than a predefined threshold. In an exemplary embodiment, the predefined threshold may be set by a designer of convolutional neural network 200A according to a required performance of convolutional neural network 200A. In an exemplary embodiment, to increase the performance of convolutional neural network 200A, a value of the predefined threshold may be decreased.

In an exemplary embodiment, the loss function may be defined as a function of different components (e.g., mean, variance, etc.) of training distribution 226 and a ground truth distribution associated with the training image.

In an exemplary embodiment, the loss function may be defined by the following:

$$L(p, q) = \sum_{m=1}^{M} p_m \log\left(\frac{p_m}{q_m}\right)$$

where $L(\cdot,\cdot)$ is the loss function, p is training distribution 226, q is a ground truth distribution associated with the training image, $p_m$ is an $m^{th}$ component of the training distribution, $q_m$ is an $m^{th}$ component of the ground truth distribution, and M is a number of the plurality of scores. An exemplary ground truth distribution may be obtained from a plurality of viewers. In doing so, each viewer of the plurality of viewers may assign a score from the plurality of scores to training image 218. Next, in an exemplary embodiment, a histogram of scores for training image 218 may be obtained and regarded as the ground truth distribution associated with training image 218. In an exemplary embodiment, the loss function may represent a measure of distance between the ground truth distribution and training distribution 226. Other exemplary types of loss functions may also be defined in step 116, e.g., earth mover's distance, mean square error, or mean absolute error.

Figure 1F:
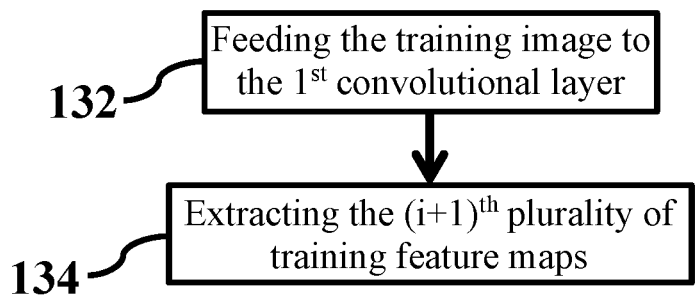
FIG. 1F shows a flowchart for generating a plurality of training feature maps, consistent with one or more exemplary embodiments of the present disclosure.

For further detail with respect to step 122, FIG. 1F shows a flowchart for generating a plurality of training feature maps, consistent with one or more exemplary embodiments of the present disclosure. Referring to FIGS. 1F and 2C, in an exemplary embodiment, generating $(i+1)^{th}$ plurality of training feature maps 220 may include feeding training image 218 to first $(1^{st})$ of plurality of convolutional layers 202 (step 132) and extracting $(i+1)^{th}$ plurality of training feature maps 220 from an output 228 of $i^{th}$ convolutional layer 208 (step 134).

For further detail with respect to step 132, in an exemplary embodiment, training image 218 may include a first $(1^{st})$ plurality of training feature maps. Therefore, feeding training image 218 to first $(1^{st})$ convolutional layer 206 may include feeding each training feature map of first $(1^{st})$ plurality of training feature maps to first $(1^{st})$ convolutional layer 206. In an exemplary embodiment, each feature map of the first $(1^{st})$ plurality of training feature maps may be associated with a channel of training image 218, e.g., a red, a green, or a blue channel.

In further detail regarding step 134, in an exemplary embodiment, convolutional neural network 200A may be a deep neural network. Therefore, a performance of training convolutional neural network 200A may be negatively impacted by overfitting. In an exemplary embodiment, when a deep neural network gets impacted by overfitting, the deep neural network may provide very low values of error defined as a difference between ground truth and training outputs. However, the performance of the deep neural network for test data may be drastically degraded. To resolve this issue, in an exemplary embodiment, extracting $(i+1)^{th}$ plurality of training feature maps 220 may include applying a first dropout process on the output of $i^{th}$ convolutional layer 208. The first dropout process may eliminate an element of each of $(i+1)^{th}$ plurality of training feature maps 220 with a predefined probability that may be set by a designer of convolutional neural network 200A. Therefore, extracting each of $(i+1)^{th}$ plurality of training feature maps 220 associated with training image 218 may be subjected to a specific first dropout process that may eliminate a specific set of elements of $(i+1)^{th}$ plurality of training feature maps 220. In an exemplary embodiment, the predefined probability may be adjusted such that a negative impact of overfitting is suppressed, i.e., a value of the loss function in a testing phase becomes lower than a required threshold.

In training convolutional neural network 200A, a value of each element in $(i+1)^{th}$ plurality of feature maps 214 may vary in a large interval. Consequently, in an exemplary embodiment, a training speed of convolutional neural network 200A may be low, since convolutional neural network 200A may need to be trained for a very wide interval of values at each layer. To compensate this issue, in an exemplary embodiment, each of plurality of convolutional layers 202 may include a batch normalization process. In an exemplary embodiment, the batch normalization process may normalize $(i+1)^{th}$ plurality of feature maps 214 utilizing an average and a standard deviation of a set of $(i+1)^{th}$ plurality of feature maps 214 associated with a batch of training images. In doing so, the plurality of training images may be partitioned into a plurality of training image batches. Next, an exemplary set of $(i+1)^{th}$ plurality of feature maps 214 associated with each of training image batches may be obtained. Afterwards, in an exemplary embodiments, an average and a standard deviation of the set of $(i+1)^{th}$ plurality of feature maps 214 may be obtained and all elements of the set of $(i+1)^{th}$ plurality of feature maps 214 may be normalized in accordance to the average and the standard deviation. Next, in an exemplary embodiments, all elements of the set of $(i+1)^{th}$ plurality of feature maps 214 may be scaled and shifted by a scale and a shift variable which may be learned during training process. Therefore, in an exemplary embodiments, all elements of $(i+1)^{th}$ plurality of feature maps 214 may follow a normal distribution which may considerably reduce a required time for training convolutional neural network 200A. In an exemplary embodiment, extracting $(i+1)^{th}$ plurality of training feature maps 220 may be similar to extracting $(i+1)^{th}$ plurality of feature maps 214. Moreover, in an exemplary embodiment, obtaining an $(i+1)^{th}$ training feature set 222 may be similar to obtaining $(i+1)^{th}$ feature set 243.

Referring again to FIGS. 1E and 2C, step 126 may include extracting a training distribution 226 from plurality of training feature sets 224. In further detail with respect to step 126, in an exemplary embodiment, extracting training distribution 226 may include feeding plurality of training feature sets 224 to first ($1^{st}$) fully connected layer 212 of plurality of fully connected layers 204. In an exemplary embodiment, extracting training distribution 226 may include applying a second dropout process on a $k^{th}$ fully connected output 252. In an exemplary embodiment, the second dropout process may include eliminating each element of $k^{th}$ fully connected output 252 with a predefined probability for training image 218. Therefore, extracting each training distribution associated with each of the plurality of training images may be subjected to a specific second dropout process that may eliminate a specific set of output elements of $k^{th}$ fully connected output 252.

For further detail with regards to step 128, in an exemplary embodiment, each of the plurality of adjustment values may be associated with a respective initial weight of the plurality of initial weights. In an exemplary embodiment, minimizing the loss function may be performed utilizing a gradient descent method. In an exemplary gradient descent method, each adjustment value of the plurality of adjustment values may be proportional to a gradient of the loss function associated with each initial weight of the plurality of initial weights. Exemplary adjustment values associated with each convolutional layer of plurality of convolutional layers 202 and each fully connected layer of plurality of fully connected layers 204 may be obtained utilizing a back propagation algorithm. For further detail with respect to step 130, in an exemplary embodiment, the plurality of updated weights may be obtained by adding each of the plurality of adjustment values to a respective initial weight of the plurality of initial weights.

Referring again to FIG. 1B, in an exemplary embodiment, step 110 may include feeding image 210 to first ($1^{st}$) convolutional layer 206. In further detail regarding step 110, in an exemplary embodiment, image 210 may include a first ($1^{st}$) plurality of feature maps. In an exemplary embodiment, each feature map of the first ($1^{st}$) plurality of feature maps may be associated with a channel of image 210. For example, each feature map of the first ($1^{st}$) plurality of feature maps may be associated with one of a red, a green, or a blue channel of image 210. In an exemplary embodiment, feeding image 210 to first ($1^{st}$) convolutional layer 206 may include feeding each of the first ($1^{st}$) plurality of feature maps to first ($1^{st}$) convolutional layer 206.

Figure 1G:
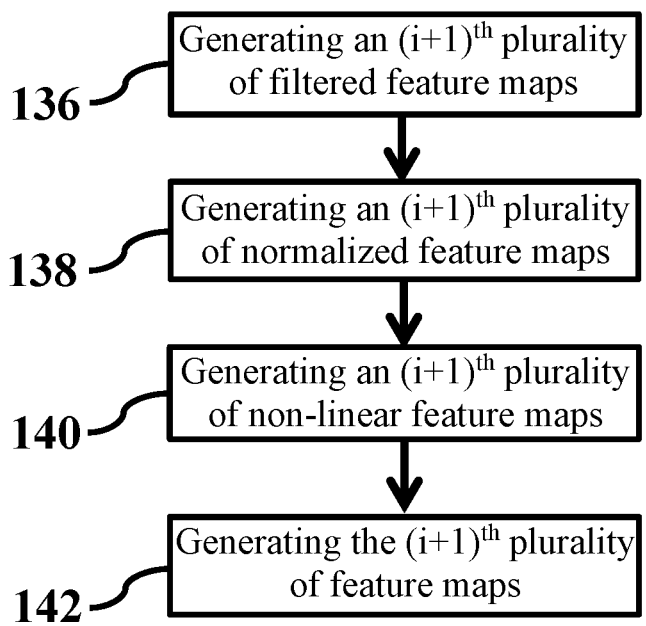
FIG. 1G shows a flowchart for extracting a plurality of feature maps, consistent with one or more exemplary embodiments of the present disclosure.

For further detail with respect to step 112, FIG. 1G shows a flowchart for extracting an $(i+1)^{th}$ plurality of feature maps, consistent with one or more exemplary embodiments of the present disclosure. Referring to FIG. 2B, in an exemplary embodiment, $i^{th}$ convolutional layer 208 may include an $i^{th}$ plurality of filters 230, a batch normalization layer 232, an $i^{th}$ non-linear activation layer 234, and a pooling layer 236. In an exemplary embodiment, extracting $(i+1)^{th}$ plurality of feature maps 214 may include generating an $(i+1)^{th}$ plurality of filtered feature maps 238 (step 136), generating an $(i+1)^{th}$ plurality of normalized feature maps 240 (step 138), generating an $(i+1)^{th}$ plurality of non-linear feature maps 242 (step 140), and generating $(i+1)^{th}$ plurality of feature maps 214 (step 142).

In further detail with regards to step 136, in an exemplary embodiment, generating $(i+1)^{th}$ plurality of filtered feature maps 238 may include applying $i^{th}$ plurality of filters 230 on $i^{th}$ plurality of feature maps 216. In an exemplary embodiment, each filter of $i^{th}$ plurality of filters 230 may include $N_i$ number of two dimensional filters, where $N_i$ is a number of $i^{th}$ plurality of feature maps 216. An exemplary two dimensional filter may include a matrix which may perform a convolution operation on a window of a respective feature map of $i^{th}$ plurality of feature maps 216. In other words, an exemplary filter of $i^{th}$ plurality of filters 230 may include a three dimensional filter which may be generated by stacking $N_i$ two dimensional filters. In an exemplary embodiment, applying $i^{th}$ plurality of filters 230 on $i^{th}$ plurality of feature maps 216 may include applying each of two dimensional filters on a respective feature map of $i^{th}$ plurality of feature maps 216 and obtaining a respective result. In an exemplary embodiment, the respective result may correspond to an output of an exemplary two dimensional filter. An element of each of $(i+1)^{th}$ plurality of filtered feature maps 238 may be obtained by a summation over respective results associated with each of two dimensional filters. Next, in an exemplary embodiment, a respective filtered feature map of $(i+1)^{th}$ plurality of filtered feature maps 238 may be obtained by sweeping each two dimensional filter on the respective feature map. In an exemplary embodiment, applying $i^{th}$ plurality of filters 230 on $i^{th}$ plurality of feature maps 216 may include applying a separable convolution on $i^{th}$ plurality of feature maps 216. An exemplary separable convolution may break down $N_i$ two dimensional convolutions into two simpler types of convolutions, i.e., a depth wise convolution and a point wise convolution. This may reduce a number of all weights of a neural network and may result in computational efficiency.

For further detail with respect to step 138, in an exemplary embodiment, generating $(i+1)^{th}$ plurality of normalized feature maps 240 may include applying a batch normalization process on $(i+1)^{th}$ plurality of filtered feature maps 238. In an exemplary embodiment, the batch normalization process may be associated with batch normalization layer 232. In an exemplary embodiment, each normalized feature map of $(i+1)^{th}$ plurality of normalized feature maps 240 may be associated with a respective filtered feature map of $(i+1)^{th}$ plurality of filtered feature maps 238. The batch normalization process may be similar to that of step 134. However, there may be no training image batches in generating $(i+1)^{th}$ plurality of normalized feature maps 240. Therefore, in an exemplary embodiment, an average and a standard deviation used for batch normalization may be obtained from a set of averages and a set of standard deviations associated with all batches of training image batches.

In further detail regarding step 140, in an exemplary embodiment, generating $(i+1)^{th}$ plurality of non-linear feature maps 242 may include implementing an $i^{th}$ non-linear activation function on each of $(i+1)^{th}$ plurality of normalized feature maps 240. In an exemplary embodiment, the $i^{th}$ non-linear activation function may be associated to the $i^{th}$ non-linear activation layer 234. In an exemplary embodiment, implementing the $i^{th}$ non-linear activation function may include implementing one of a rectified linear unit (ReLU) function or an exponential linear unit (ELU) function. In an exemplary embodiment, implementing each of the $i^{th}$ non-linear activation function may include implementing other types of activation functions such as leaky ReLU, scaled ELU, parametric ReLU, etc.

For further detail with regards to step 142, in an exemplary embodiment, generating $(i+1)^{th}$ plurality of feature maps 214 may include applying a max pooling on each of $(i+1)^{th}$ plurality of non-linear feature maps 242. In an exemplary embodiment, the max pooling may be performed utilizing pooling layer 236. In an exemplary embodiment, generating $(i+1)^{th}$ plurality of feature maps 214 may further include applying an average pooling on each of $(i+1)^{th}$ plurality of non-linear feature maps 242. In an exemplary embodiment, the average pooling may be associated with pooling layer 236. An exemplary pooling layer may apply a window of a predefined size on each of $(i+1)^{th}$ plurality of non-linear feature maps 242 and obtain a maximum or average of windowed version of each of $(i+1)^{th}$ plurality of non-linear feature maps 242. Therefore, in an exemplary embodiment, each of $(i+1)^{th}$ plurality of feature maps 214 may be generated by sweeping the window on each of $(i+1)^{th}$ plurality of non-linear feature maps 242. As a result, a size of each of $(i+1)^{th}$ plurality of non-linear feature maps 242 may be smaller than a size of a respective non-linear feature map of $(i+1)^{th}$ plurality of non-linear feature maps 242. Consequently, a number of required operations may proportionally be decreased.

Referring again to FIGS. 1A, 2A, and 2B, in an exemplary embodiment, step 104 may include obtaining $(i+1)^{th}$ feature set 243 of a plurality of feature sets 246 from $(i+1)^{th}$ plurality of feature maps 214. In further detail regarding step 104, in an exemplary embodiment, obtaining an $(i+1)^{th}$ feature set 243 may include applying a global average pooling on $(i+1)^{th}$ plurality of non-linear feature maps 242. In an exemplary embodiment, global average pooling layer 205 may be configured to perform the global average pooling. In an exemplary embodiment, the global average pooling may include obtaining an average of each non-linear feature map of $(i+1)^{th}$ plurality of non-linear feature maps 242. In an exemplary embodiment, global average pooling layer 205 may be configured to obtain a set of statistical features from each of $(i+1)^{th}$ plurality of non-linear feature maps 242. For example, global average pooling layer 205 may be configured to obtain a standard deviation, or a moment of an arbitrary order. In an exemplary embodiment, a size of an output of a convolutional layer may be proportional to a size of an input of the convolutional layer. In an exemplary embodiment, when a size of the input of the convolutional layer is H×W and a size of a two dimensional filter corresponding to the convolutional layer is M×N, a size of an output of the convolutional layer may become (H−M+1)× (W−N+1). Obtaining each feature set from each of $(i+1)^{th}$ plurality of non-linear feature maps 242 using global statistics, i.e., using all elements of each of $(i+1)^{th}$ plurality of non-linear feature maps 242, may result in feature sets of a size that may be independent of a size of each of $i^{th}$ plurality of feature maps 216. As a result, in an exemplary embodiment, a score distribution 244 with a predefined number of plurality of scores for image 210 may be obtained from convolutional neural network 200A where image 210 may be of an arbitrary size.

In an exemplary embodiment, obtaining the plurality of feature sets from each convolutional layer of plurality of convolutional layers 202 may lead to different combinations of feature maps. In an exemplary embodiment, feature sets obtained from both low convolutional layers (e.g., first ($1^{st}$) convolutional layer 206) and high convolutional layers (e.g., an $N^{th}$ convolutional layer, where N is a number of plurality of convolutional layers 202) may provide more information to plurality of fully connected layers 204 compared with obtaining features sets solely from the $N^{th}$ convolutional layer. On the other hand, plurality of fully connected layers 204 may be connected to low convolutional layers through feature sets obtained from feature maps associated low convolutional layers. Therefore, a value of gradient may be considerable with respect to weights in low convolutional layers, which may prevent a vanishing gradient phenomenon.

Figure 1H:
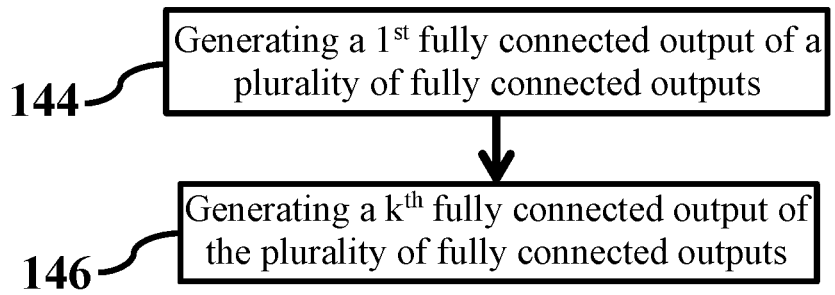
FIG. 1H shows a flowchart for extracting a score distribution, consistent with one or more exemplary embodiments of the present disclosure.

For further detail with respect to step 106, FIG. 1H shows a flowchart of for extracting a score distribution, consistent with one or more exemplary embodiments of the present disclosure. Referring to FIG. 2A, in an exemplary embodiment, the plurality of scores may be associated with image 210. In an exemplary embodiment, score distribution 244 may be extracted by feeding plurality of feature sets 246 to first ($1^{st}$) fully connected layer 212. In an exemplary embodiment, extracting score distribution 244 may include generating a first ($1^{st}$) fully connected output 248 of a plurality of fully connected outputs 250 (step 144) and generating $k^{th}$ fully connected output 252 of the plurality of fully connected outputs (step 146).

In further detail with regards to step 144, in an exemplary embodiment, generating first ($1^{st}$) fully connected output 248 may include applying plurality of feature sets 246 to first ($1^{st}$) fully connected layer 212 of plurality of fully connected layers 204. In an exemplary embodiment, applying plurality of feature sets 246 to first ($1^{st}$) fully connected layer 212 may include arranging plurality of feature sets 246 into a feature vector and applying the feature vector to first ($1^{st}$) fully connected layer 212.

For further detail regarding step 146, in an exemplary embodiment, generating $k^{th}$ fully connected output 252 may include applying a $(k-1)^{th}$ fully connected output 254 of plurality of fully connected outputs 250 to a $k^{th}$ fully connected layer 256 of plurality of fully connected layers 204, where $1 \le k \le L$, and L is a number of plurality of fully connected layers 204. In an exemplary embodiment, applying the $(k-1)^{th}$ fully connected output to $k^{th}$ fully connected layer 256 may include implementing an $(N+k)^{th}$ non-linear activation function on $(k-1)^{th}$ fully connected output 254. In an exemplary embodiment, implementing the $(N+k)^{th}$ non-linear activation function may include implementing one of a rectified linear unit (ReLU) function or an exponential linear unit (ELU) function. In an exemplary embodiment, implementing the $(N+k)^{th}$ non-linear activation function may include implementing other types of activation functions such as leaky ReLU, scaled ELU, parametric ReLU, etc. In an exemplary embodiment, an $(N+L)^{th}$ non-linear activation function may include a softmax function. In an exemplary embodiment, a $0^{th}$ fully connected output may include plurality of feature sets 246. In an exemplary embodiment, an $L^{th}$ fully connected output 258 of plurality of fully connected outputs 250 may include score distribution 244.

Figure 3:
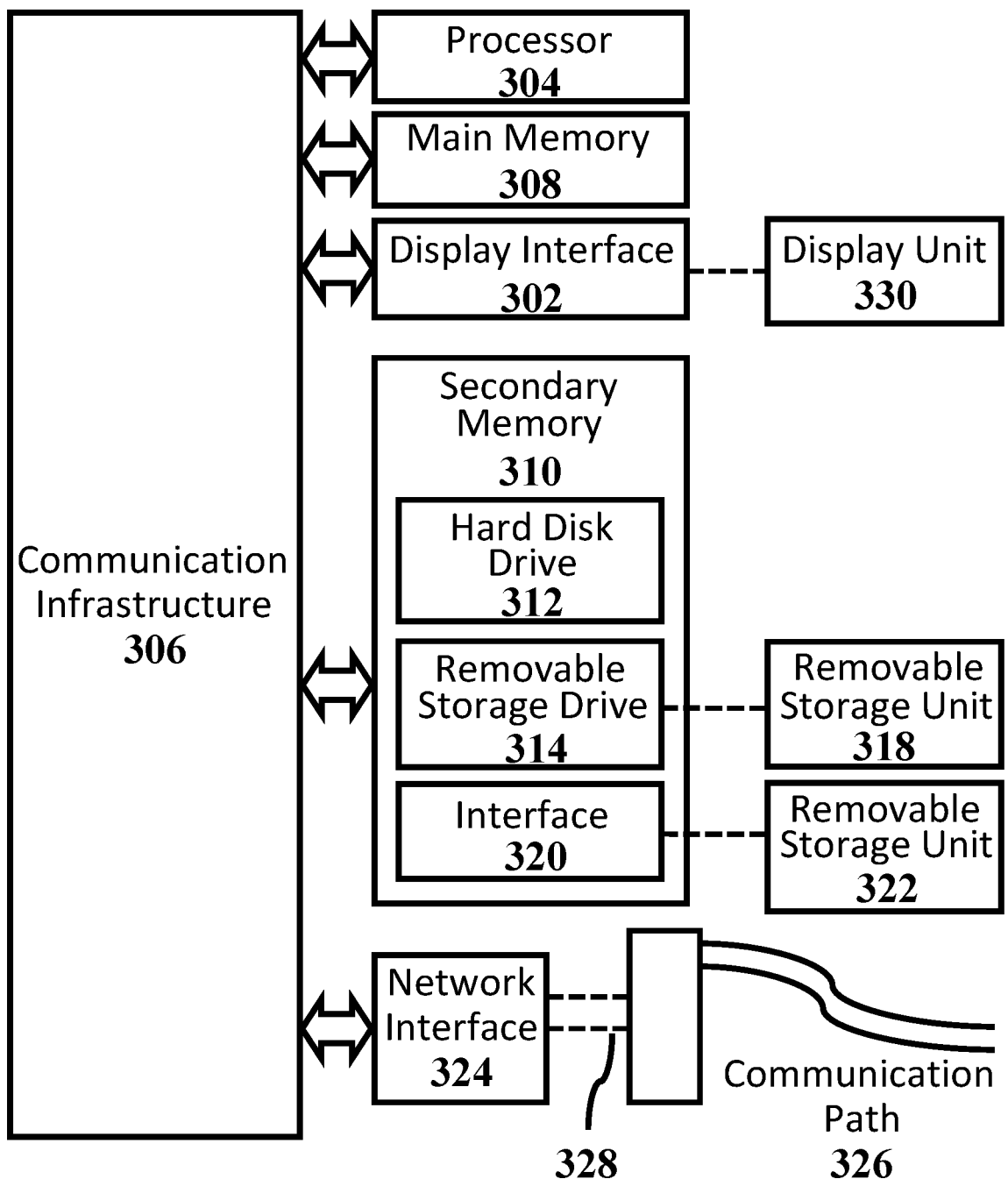
FIG. 3 shows a high-level functional block diagram of a computer system, consistent with one or more exemplary embodiments of the present disclosure.

FIG. 3 shows an example computer system 300 in which an embodiment of the present invention, or portions thereof, may be implemented as computer-readable code, consistent with exemplary embodiments of the present disclosure. For example, different steps of method 100 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2C.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 304 may be a special purpose (e.g., a graphical processing unit) or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324.

Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations in method 100 illustrated by flowchart 100 of FIG. 1A and flowchart 102 of FIG. 1B discussed above. Accordingly, such computer programs represent controllers of computer system 300. Where an exemplary embodiment of method 100 is implemented using software, the software may be stored in a computer program product and loaded into computer system 300 using removable storage drive 314, interface 320, and hard disk drive 312, or communications interface 324.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

Figure 4:
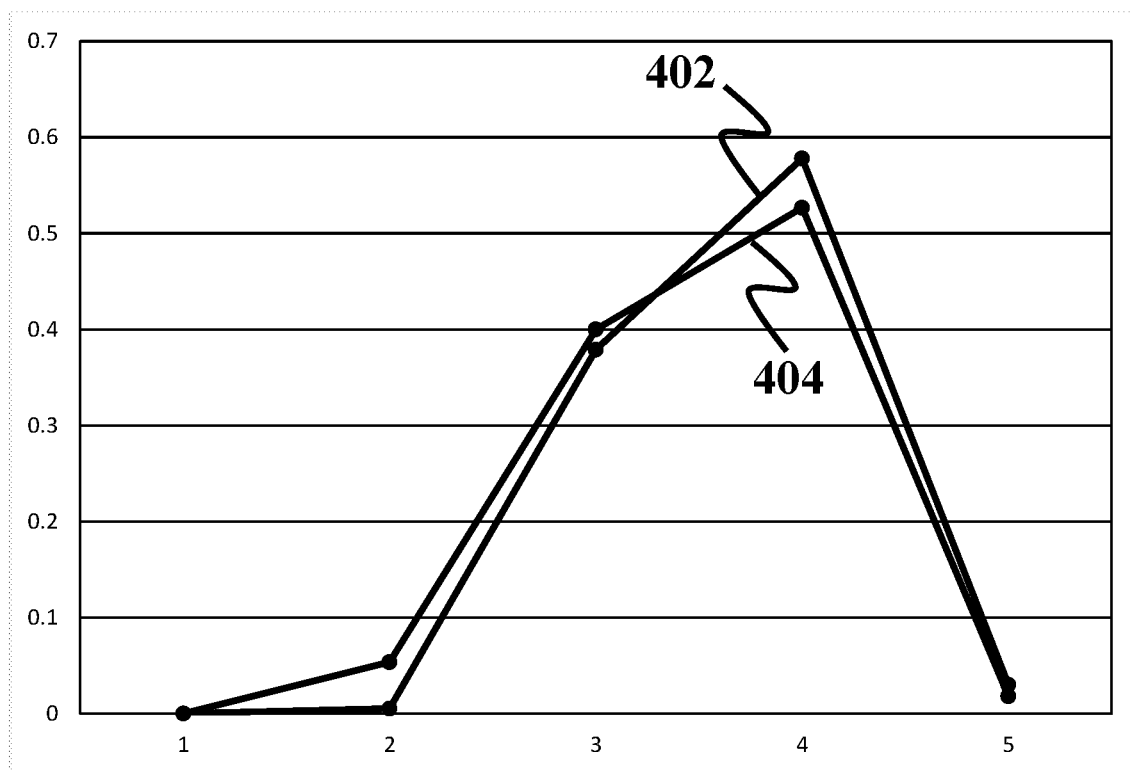
FIG. 4 shows a ground truth distribution and a score distribution of an image, consistent with exemplary embodiments of the present disclosure.

In this example, a performance of a method (analogous to method 100) for quality assessment of an image (analogous to image 210) is demonstrated. Different steps of the method are implemented utilizing a convolutional neural network (analogous to convolutional neural network 200A). The image and a plurality of training images include three channels associated with a red, a green, and a blue channel. The convolutional neural network includes four convolutional layers (each analogous to $i^{th}$ convolutional layer 208) including 32, 64, 128, and 256 number of two dimensional filters (analogous to $i^{th}$ plurality of filters 230). All of two dimensional filters are of a 5×5 size. Each convolutional layer includes a batch normalization layer, an ELU non-linear activation function layer, a dropout layer, and a max pooling layer. The dropout layer is configured to apply a first dropout process in which dropout probabilities of convolutional layers are set to about 0.2, 0.2, 0.3, and 0.4 from first ($1^{st}$) convolutional layer (analogous to first ($1^{st}$) convolutional layer 206) to $4^{th}$ convolutional layer, respectively. The pooling layer of each convolutional layer includes a max pooling layer with a window of 3×3 size. A global average layer (analogous to global average pooling layer 205) obtains an average of each of a plurality of feature maps (analogous to $(i+1)^{th}$ plurality of feature maps 214). The convolutional neural network further includes three fully connected layers (analogous to plurality of fully connected layers 204), including 512, 512, and 5 neurons. A second dropout process is applied to two first fully connected layers with a dropout probability of 0.2. FIG. 4 shows a ground truth distribution and a score distribution of an image, consistent with exemplary embodiments of the present disclosure. As FIG. 4 shows, a score distribution 402 (analogous to score distribution 244) obtained by the convolutional neural network matches a ground truth distribution 404 for the image.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for quality assessment of an image, the method comprising:
   generating, utilizing one or more processors, an $(i+1)^{th}$ plurality of feature maps from the image by:
      feeding the image to a first convolutional layer of a plurality of convolutional layers associated with a convolutional neural network, the image comprising a first plurality of feature maps; and extracting the $(i+1)^{th}$ plurality of feature maps by applying an $i^{th}$ plurality of feature maps to an $i^{th}$ convolutional layer of the plurality of convolutional layers, where $1 \le i \le N$ and N is a number of the plurality of convolutional layers;

obtaining, utilizing the one or more processors, an $(i+1)^{th}$ feature set of a plurality of feature sets from the $(i+1)^{th}$ plurality of feature maps; and extracting, utilizing the one or more processors, a score distribution for a plurality of scores associated with the image from the plurality of feature sets by:

generating a first fully connected output of a plurality of fully connected outputs by applying the plurality of feature sets to a first fully connected layer of a plurality of fully connected layers associated with the convolutional neural network; and generating a $k^{th}$ fully connected output of the plurality of fully connected outputs by applying a $(k-1)^{th}$ fully connected output of a plurality of fully connected outputs to a $k^{th}$ fully connected layer of the plurality of fully connected layers, where $1 \le k \le L$, L is a number of the plurality of fully connected layers, a $0^{th}$ fully connected output comprises the plurality of feature sets, and an $L^{th}$ fully connected output of the plurality of fully connected outputs comprises the score distribution.

2. The method of claim 1, wherein generating the $(i+1)^{th}$ plurality of feature maps comprises training the convolutional neural network prior to feeding the image to the first convolutional layer, training the convolutional neural network comprising:

initializing the convolutional neural network by a plurality of initial weights; and repeating an iterative process until a termination condition is satisfied, the iterative process comprising:

generating a plurality of updated weights by feeding a training image of a plurality of training images to the convolutional neural network; and replacing the plurality of initial weights with the plurality of updated weights.

3. The method of claim 2, wherein generating the plurality of updated weights comprises:

generating an $(i+1)^{th}$ plurality of training feature maps from the training image by:

feeding the training image to the first convolutional layer of the plurality of convolutional layers; and extracting the $(i+1)^{th}$ plurality of training feature maps from an output of the $i^{th}$ convolutional layer;

obtaining an $(i+1)^{th}$ training feature set of a plurality of training feature sets from the $(i+1)^{th}$ plurality of training feature maps;

extracting a training distribution from the plurality of training feature sets by feeding the plurality of training feature sets to the first fully connected layer of the plurality of fully connected layers;

generating a plurality of adjustment values by minimizing a loss function, each of the plurality of adjustment values associated with a respective initial weight of the plurality of initial weights; and obtaining the plurality of updated weights by adding each of the plurality of adjustment values to a respective initial weights of the plurality of initial weights.

4. The method of claim 3, wherein extracting the $(i+1)^{th}$ plurality of feature maps comprises:

generating an $(i+1)^{th}$ plurality of filtered feature maps by applying an $i^{th}$ plurality of filters on the $i^{th}$ plurality of feature maps, the $i^{th}$ plurality of filters associated with the $i^{th}$ convolutional layer;

generating an $(i+1)^{th}$ plurality of normalized feature maps by applying a batch normalization process associated with the $i^{th}$ convolutional layer on the $(i+1)^{th}$ plurality of filtered feature maps, each normalized feature map of the $(i+1)^{th}$ plurality of normalized feature maps associated with a respective filtered feature map of the $(i+1)^{th}$ plurality of filtered feature maps;

generating an $(i+1)^{th}$ plurality of non-linear feature maps by implementing an $i^{th}$ non-linear activation function associated with the $i^{th}$ convolutional layer on each of the $(i+1)^{th}$ plurality of normalized feature maps; and generating the $(i+1)^{th}$ plurality of feature maps by applying a max pooling associated with the $i^{th}$ convolutional layer on each of the $(i+1)^{th}$ plurality of non-linear feature maps.

5. The method of claim 4, wherein obtaining the $(i+1)^{th}$ feature set comprises applying a global average pooling on the $(i+1)^{th}$ plurality of non-linear feature maps, the global average pooling comprising obtaining an average of each non-linear feature map of the $(i+1)^{th}$ plurality of non-linear feature maps.

6. The method of claim 4, wherein applying the $i^{th}$ plurality of filters on the $i^{th}$ plurality of feature maps comprises applying a separable convolution on the $i^{th}$ plurality of feature maps.

7. The method of claim 4, wherein applying the $(k-1)^{th}$ fully connected output to the $k^{th}$ fully connected layer comprises implementing an $(N+k)^{th}$ non-linear activation function on the $(k-1)^{th}$ fully connected output, an $(N+L)^{th}$ non-linear activation function comprising a softmax function.

8. The method of claim 7, wherein:

extracting the $(i+1)^{th}$ plurality of training feature maps comprises applying a first dropout process on the output of the $i^{th}$ convolutional layer; and extracting the training distribution comprises applying a second dropout process on an output of the $k^{th}$ fully connected layer.

9. The method of claim 7, wherein implementing each of the $i^{th}$ non-linear activation function and the $(N+k)^{th}$ non-linear activation function comprises implementing one of a rectified linear unit (ReLU) function or an exponential linear unit (ELU) function.

10. The method of claim 3, wherein repeating the iterative process comprises repeating the iterative process until a value of the loss function becomes lower than a predefined threshold, the loss function defined by the following:

$$L(p, q) = \sum_{m=1}^{M} p_m \log\left(\frac{p_m}{q_m}\right)$$

where:

$L(\cdot, \cdot)$ is the loss function, p is the training distribution, q is a ground truth distribution associated with the training image, $p_m$ is an $m^{th}$ component of the training distribution, $q_m$ is an $m^{th}$ component of the ground truth distribution, and M is a number of the plurality of scores.

11. A convolutional neural network system for quality assessment of an image, comprising:
   a memory having processor-readable instructions stored therein; and
   one or more processors configured to access the memory and execute the processor-readable instructions, which, when executed by the one or more processors configures the one or more processors to perform a method, the method comprising:
      generating a plurality of convolutional layers comprising:
         a first convolutional layer configured to receive the image, the image comprising a first plurality of feature maps; and
         an $i^{th}$ convolutional layer configured to extract an $(i+1)^{th}$ plurality of feature maps from an $i^{th}$ plurality of feature maps, where $1 \leq i \leq N$ and N is a number of the plurality of convolutional layers;
      generating a global average pooling layer configured to obtain an $(i+1)^{th}$ feature set of a plurality of feature sets from the $(i+1)^{th}$ plurality of feature maps by obtaining an average of each feature map of the $(i+1)^{th}$ plurality of feature maps; and
      generating a plurality of fully connected layers configured to extract a score distribution for a plurality of scores associated with the image from the plurality of feature sets, the plurality of fully connected layers comprising:
         a first fully connected layer configured to generate a first fully connected output of a plurality of fully connected outputs from the plurality of feature sets; and
         a $k^{th}$ fully connected layer configured to generate a $k^{th}$ fully connected output of the plurality of fully connected outputs from a $(k-1)^{th}$ fully connected output of the plurality of fully connected outputs by applying the $(k-1)^{th}$ fully connected output to an $(N+k)^{th}$ non-linear activation function where $1 \leq k \leq L$, where:
            L is a number of the plurality of fully connected layers,
            a $0^{th}$ fully connected output comprises the plurality of feature sets, and
            an $L^{th}$ fully connected output of the plurality of fully connected outputs comprises the score distribution.

12. The convolutional neural network system of claim 11, wherein the $i^{th}$ convolutional layer comprises:
   an $i^{th}$ plurality of filters configured to generate an $(i+1)^{th}$ plurality of filtered feature maps from the $i^{th}$ plurality of feature maps by applying a separable convolution on the $i^{th}$ plurality of feature maps;
   a batch normalization layer configured to generate an $(i+1)^{th}$ plurality of normalized feature maps from the $(i+1)^{th}$ plurality of filtered feature maps by applying a batch normalization process on the $(i+1)^{th}$ plurality of filtered feature maps, each normalized feature map of the $(i+1)^{th}$ plurality of normalized feature maps associated with a respective filtered feature map of the $(i+1)^{th}$ plurality of filtered feature maps;
   an $i^{th}$ non-linear activation layer configured to generate an $(i+1)^{th}$ plurality of non-linear feature maps from the $(i+1)^{th}$ plurality of normalized feature maps by implementing an $i^{th}$ non-linear activation function on each of the $(i+1)^{th}$ plurality of non-linear feature maps, the $i^{th}$ non-linear activation function comprising one of a rectified linear unit (ReLU) function or an exponential linear unit (ELU) function; and
   a pooling layer configured to generate the $(i+1)^{th}$ plurality of feature maps by apply a max pooling on each of the $(i+1)^{th}$ plurality of non-linear feature maps.

13. The convolutional neural network system of claim 11, wherein
   an $(N+L)^{th}$ non-linear activation function comprises a softmax function.

14. A system for quality assessment of an image, the system comprising:
   a memory having processor-readable instructions stored therein; and
   one or more processors configured to access the memory and execute the processor-readable instructions, which, when executed by the one or more processors configures the one or more processors to perform a method, the method comprising:
      generating an $(i+1)^{th}$ plurality of feature maps from the image by:
         feeding the image to a first convolutional layer of a plurality of convolutional layers associated with a convolutional neural network, the image comprising a first plurality of feature maps; and
         extracting the $(i+1)^{th}$ plurality of feature maps by applying an $i^{th}$ plurality of feature maps to an $i^{th}$ convolutional layer of the plurality of convolutional layers, where $1 \leq i \leq N$ and N is a number of the plurality of convolutional layers;
      obtaining an $(i+1)^{th}$ feature set of a plurality of feature sets from the $(i+1)^{th}$ plurality of feature maps applying a global average pooling on the $(i+1)^{th}$ plurality of feature maps, the global average pooling comprising obtaining an average of each feature map of the $(i+1)^{th}$ plurality of feature maps; and
      extracting a score distribution for a plurality of scores associated with the image from the plurality of feature sets by:
         generating a first fully connected output of a plurality of fully connected outputs by applying the plurality of feature sets to a first fully connected layer of a plurality of fully connected layers associated with the convolutional neural network; and
         generating a $k^{th}$ fully connected output of the plurality of fully connected outputs by applying a $(k-1)^{th}$ fully connected output of a plurality of fully connected outputs to a $k^{th}$ fully connected layer of the plurality of fully connected layers,
         where $1 \leq k \leq L$, L is a number of the plurality of fully connected layers, a $0^{th}$ fully connected output comprises the plurality of feature sets, and an $L^{th}$ fully connected output of the plurality of fully connected outputs comprises the score distribution.

15. The system of claim 14, wherein generating the $(i+1)^{th}$ plurality of feature maps comprises training the convolutional neural network prior to feeding the image to the first convolutional layer, training the convolutional neural network comprising:
   initializing the convolutional neural network by a plurality of initial weights; and
   repeating an iterative process until a termination condition is satisfied, the iterative process comprising:
      generating a plurality of updated weights by feeding a training image of a plurality of training images to the convolutional neural network; and replacing the plurality of initial weights with the plurality of updated weights.

16. The method of claim 15, wherein generating the plurality of updated weights comprises:
generating an $(i+1)^{th}$ plurality of training feature maps from the training image by:
feeding the training image to the first convolutional layer of the plurality of convolutional layers; and
extracting the $(i+1)^{th}$ plurality of training feature maps from an output of the $i^{th}$ convolutional layer;
obtaining an $(i+1)^{th}$ training feature set of the plurality of training feature sets from the $(i+1)^{th}$ plurality of training feature maps;
extracting a training distribution from the plurality of training feature sets by feeding the plurality of training feature sets to the first fully connected layer of the plurality of fully connected layers;
generating a plurality of adjustment values by minimizing a loss function, each of the plurality of adjustment values associated with a respective initial weight of the plurality of initial weights; and
obtaining the plurality of updated weights by adding each of the plurality of adjustment values to a respective initial weight of the plurality of initial weights.

17. The system of claim 16, wherein extracting the $(i+1)^{th}$ plurality of feature maps comprises:
generating an $(i+1)^{th}$ plurality of filtered feature maps by applying an $i^{th}$ plurality of filters associated with the $i^{th}$ convolutional layer on the $i^{th}$ plurality of feature maps, applying the $i^{th}$ plurality of filters comprising applying a separable convolution on the $i^{th}$ plurality of feature maps;
generating an $(i+1)^{th}$ plurality of normalized feature maps by applying a batch normalization process associated with the $i^{th}$ convolutional layer on the $(i+1)^{th}$ plurality of filtered feature maps, each normalized feature map of the $(i+1)^{th}$ plurality of normalized feature maps associated with a respective filtered feature map of the $(i+1)^{th}$ plurality of filtered feature maps;
generating an $(i+1)^{th}$ plurality of non-linear feature maps by implementing an $i^{th}$ non-linear activation function associated with the $i^{th}$ convolutional layer on each of the $(i+1)^{th}$ plurality of normalized feature maps, the $i^{th}$ non-linear activation function comprising one of a rectified linear unit (ReLU) function or an exponential linear unit (ELU) function; and
generating the $(i+1)^{th}$ plurality of feature maps by applying a max pooling associated with the $i^{th}$ convolutional layer on each of the $(i+1)^{th}$ plurality of non-linear feature maps.

18. The system of claim 17, wherein
applying the $(k-1)^{th}$ fully connected output to the $k^{th}$ fully connected layer comprises implementing an $(N+k)^{th}$ non-linear activation function on the $(k-1)^{th}$ fully connected output, an $(N+L)^{th}$ non-linear activation function comprising a softmax function.

19. The system of claim 18, wherein:
extracting the $(i+1)^{th}$ plurality of training feature maps comprises applying a first dropout process on the output of the $i^{th}$ convolutional layer; and
extracting the training distribution comprises applying a second dropout process on an output of the $k^{th}$ fully connected layer.

20. The system of claim 16, wherein repeating the iterative process comprises repeating the iterative process until a value of the loss function becomes lower than a predefined threshold, the loss function defined by the following:

$$L(p, q) = \sum_{m=1}^{M} p_m \log\left(\frac{p_m}{q_m}\right)$$

where:
L(·,·) is the loss function,
p is the training distribution,
q is a ground truth distribution associated with the training image,
$p_m$ is an $m^{th}$ component of the training distribution,
$q_m$ is an $m^{th}$ component of the ground truth distribution, and
M is a number of the plurality of scores.

* * * * *